United States Patent [19]

Blazey

[11] 4,164,717
[45] Aug. 14, 1979

[54] ACOUSTOOPTIC MODULATION AND DEFLECTION

[75] Inventor: Richard N. Blazey, Rochester, N.Y.

[73] Assignee: Eastman Kodak Company, Rochester, N.Y.

[21] Appl. No.: 849,375

[22] Filed: Nov. 7, 1977

[51] Int. Cl.² ............................................. H01S 3/10
[52] U.S. Cl. .................................... 332/7.51; 350/358
[58] Field of Search ............... 332/7.51; 350/353, 355, 350/358; 250/199

[56] References Cited

U.S. PATENT DOCUMENTS

| 3,055,258 | 9/1962 | Hurvitz | 350/358 |
| 3,088,113 | 4/1963 | Rosenthal | 350/358 |
| 3,746,427 | 7/1973 | Foster | 350/353 |
| 3,799,652 | 3/1974 | Torquet | 350/355 |
| 3,800,303 | 3/1974 | Picquendar et al. | 350/353 |
| 3,869,197 | 3/1975 | Owens et al. | 350/358 |

Primary Examiner—Nelson Moskowitz
Attorney, Agent, or Firm—Warren W. Kurz

[57] ABSTRACT

Acoustooptic apparatus for intensity modulating and angularly deflecting a beam of coherent light includes optical means for spreading the beam into a sheet having a cross-sectional shape with a major axis and a minor axis, acoustooptic cell means in the path of the sheet beam and electrical-to-mechanical transducers associated with the cell means for propagating variable amplitude acoustic waves across the beam in the direction of the beam's minor axis and for propagating variable frequency acoustic waves across the beam in the direction of the beam's major axis.

6 Claims, 5 Drawing Figures

ACOUSTOOPTIC MODULATION AND DEFLECTION

BACKGROUND OF THE INVENTION

1. Field of the Invention

This invention relates to acoustooptic devices, and more particularly to such devices for intensity modulating and diffracting a light beam.

2. Description of the Prior Art

Diffraction of light by high-frequency acoustic waves is well known. When a light beam 2 of optical wavelength $\lambda$ forms an angle $\alpha$ with acoustic wavefronts 4, as shown in FIG. 1, such that $$\sin \alpha = \lambda/2\Lambda, \tag{1}$$

where $\Lambda$ is the acoustic wavelength, a first order diffracted beam 6 appears to be reflected from the acoustic wavefronts as if they were mirrors. This phenomenon is called acoustic Bragg reflection and the angle $\alpha$ which satisfies the expression is called the Bragg angle. The diagonal lines in FIG. 1 represent optical wavefronts of incident beam 2 and diffracted beam 6.

The light modulator was the first device to make use of the diffraction of light by ultrasound. Referring to FIG. 2, a well-collimated incident beam 10 of light passes through a diffraction cell 12. An acoustic beam of ultrasound, traveling through the cell across the light beam, diffracts some of the incident light into a diffracted beam 14 to generate an optical output, the intensity of which is a function of the acoustic power. Some incident light passes through the cell as an undiffracted beam 18.

When the acoustic power is changed by amplitude modulation of the electrical information signal applied to an electro/mechanical transducer 16 in order to vary the intensity of the diffracted light beam, the acoustic wavefronts corresponding to the new signal travel across the light beam at sound velocity. Until acoustic wavefronts corresponding to the new signal have completely replaced those corresponding to the old signal in the light beam, a portion of the diffracted beam will be at one intensity while another portion will be at another intensity. Therefore, if one desires to modulate the light intensity at a fairly fast rate of intensity change, the incident light beam must be quite narrow in the direction of acoustic wave propagation. In other words, the speed that the intensity of the diffracted beam can be changed across the light beam is a function of the time that it takes for an acoustic wave to cross the beam. This time, commonly referred to as the access time $\tau$ (and referred to herein as $\tau_m$ to denote the modulation access time), is determined by the acoustic velocity v and the width of the light beam D as follows $$\tau_m = D/v. \tag{2}$$

Accordingly, for quick response, one would want the beam width D to be small.

While in the preceding description, it was pointed out that the intensity of the deflected and undeflected beams are modulated by the power applied to transducer 16, it is also true that the light beam is deflected by ultrasound based on a linear relationship between the acoustic frequency and the sine of the Bragg angle. Substituting the quotient of sound velocity v and sound frequency f for the sound wavelength $\Lambda$ in equation (1),:

$$\sin \alpha = f\lambda/2v. \tag{3}$$

Since Bragg angles are usually small, $\sin \alpha$ can be approximated in equation (3) by $\alpha$ so that $2\alpha$ represents the angle by which the diffracted beam departs from the path of the incident beam as shown in FIG. 2. To vary the direction of the diffracted beam, one varies f such that:

$$\Delta(2\alpha) = \Delta f \lambda/v. \tag{4}$$

In imaging systems, what is frequently most critical is not the magnitude of deflection angles obtainable (since the magnitude of the angles can be magnified by lenses), but rather the number of angular positions that can be clearly distinguished from each other, usually called the number of resolvable spots and denoted by the symbol N. The smallest resolvable angle $\alpha_{min}$ is conventionally approximated by $\lambda/D$. To determine the number of resolvable spots, one divides the maximum angular displacement $\Delta(2\alpha)$ by the smallest resolvable angle of a light beam projected from an aperture D (FIG. 2), or:

$$N = \frac{\Delta(2\alpha)}{\alpha_{min}} = \frac{\Delta f \lambda/v}{\lambda/D} = \frac{\Delta f D}{v} = \Delta f \tau_d \tag{5}$$

where $\tau_d$ represents the deflection access time, the aperture is uniformly illuminated and the scan time is in excess of the access time.

Thus, we see that in systems employing both modulation and deflection, the access time $\tau_m$ must be short (small aperture D) for quick response, while the access time $\tau_d$ must be long (large aperture D) for a suitable number of resolvable spots. In such systems, as shown in FIG. 3, it is common practice to use beam contracting and expanding optics for the modulator and to use sheet-beam-forming optics for the deflector. For example, in FIG. 3, the relatively large, pencil-like beam 20 from a laser 22 is concentrated by a spherical lens 24 and recollimated as a narrow beam 25 by another spherical lens 26. Narrow beam 25 passes through the acoustic beam of an acoustooptic modulator 27. Beyond modulator 27 a lens arrangement 28 includes two spherical lenses which expand the modulated beam to its original diameter. A cylindrical lens 30 shapes the beam to form a long, narrow waist centrally within a diffraction cell 31. The longest cross-sectional beam axis within cell 31 is aligned with the direction of sound propagation within the cell. Lens 32 serves to reshape the light into its original, circular cross section form. Consequently, within the modulator, a narrow, pencil-like beam interacts with the acoustic beam over a minimum thickness to minimize response time, and, within the deflector the wide, flat optical beam interacts with the acoustic beam over a maximum thickness for maximum resolution.

While the illustrated prior art arrangement results in fast modulator access and good deflector resolution, the optics required are expensive, cause an undue amount of light loss and extend the overall system length required. By the present invention, the need for optics between the modulator and the deflector has been eliminated by directing light-modulating acoustic beams across the sheet beam formed for the deflection operation. Those acoustic beams, unlike the light-deflecting acoustic beams, propagate along the shortest axis of the sheet beam.

SUMMARY OF THE INVENTION

Accordingly, by the present invention, I have provided acoustooptic apparatus for both modulation and deflection of a light beam without the need for conventional beam-shaping optics intermediate the modulating and deflecting cells. To overcome the requirement for such optics, while maintaining the desired quick modulation response and maximum resolution, the present invention includes acoustooptic modulation and deflection of an optical sheet beam with respectively orthogonal directions of sound propagation and without intervening optics. In that manner, a sheet beam can be formed and passed through acoustooptic cell means such that (1) the modulating acoustic waves propagate through the cell means in a direction parallel to the minor axis of the sheet beam and (2) the deflecting acoustic waves propagate through the cell means in a direction parallel to the major axis of the sheet beam without the requirement of separate sheet-beam-forming optics for the modulator and for the deflector.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENTS

The drawings illustrate the operating principles of preferred embodiments of the present invention. The description will be directed in particular to elements of those embodiments forming part of, or cooperating more directly with, the present invention. Elements not specifically shown or described may take various forms well known to those skilled in the art.

Figure 1:
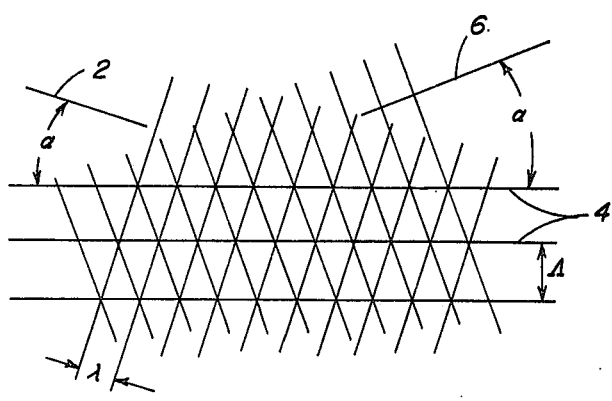
FIG. 1 is a schematic illustration of the interaction of optical and acoustic wavefronts.
Figure 2:
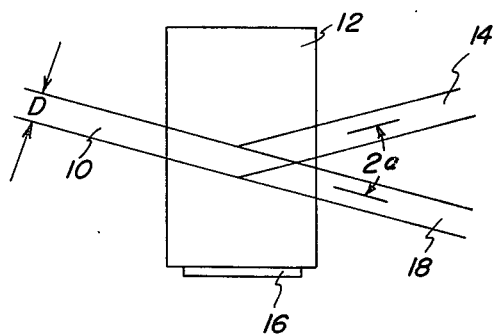
FIG. 2 is a schematic view of an acoustooptic deflector cell.
Figure 3:
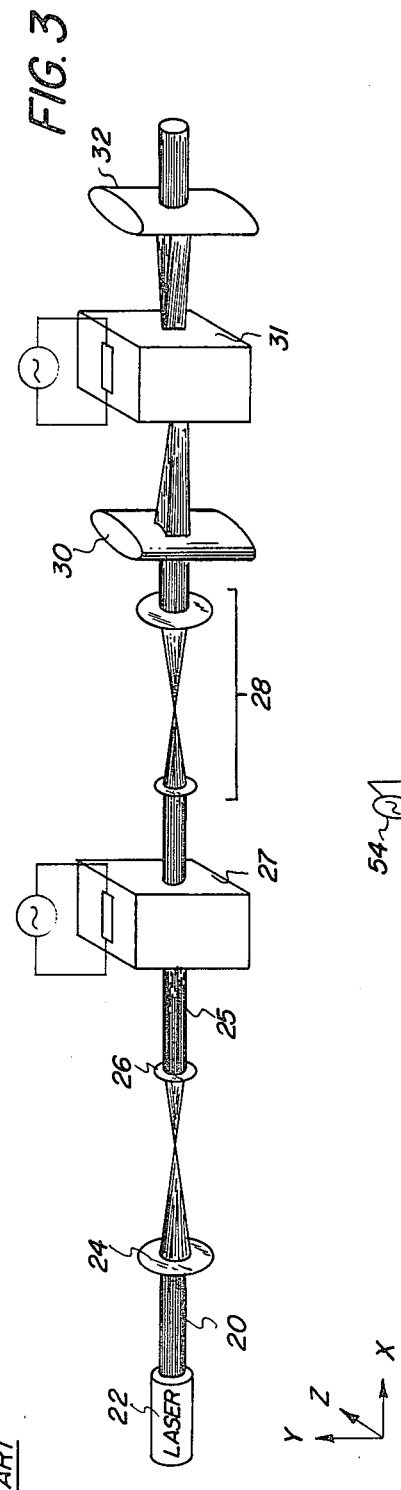
FIG. 3 is a schematic drawing of an acoustooptic modulation and deflection system in accordance with the prior art.
Figure 4:
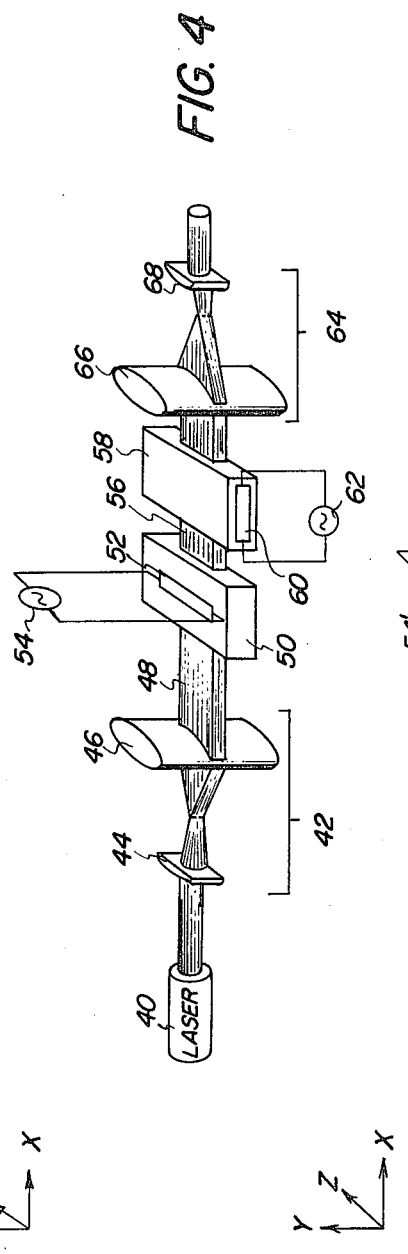
FIG. 4 is a schematic drawing of acoustooptic modulation and deflection apparatus in accordance with a preferred embodiment of the present invention.

Referring to FIG. 4, a laser 40 projects a collimated beam of coherent light along a path through sheet beam forming optics 42 including a cylindrical lens 44 oriented to spread the narrow, pencil-like beam from laser 40 in the x-z plane. Another cylindrical lens 46, confocal with cylinder lens 44 serves to recollimate the light beam into a sheet beam 48 having major and minor axes which are respectively parallel to the Z and Y axes shown in the drawings.

The sheet beam enters an acoustooptic modulator cell 50. Disposed at the top of cell 50 on a first surface is an electro/mechanical transducer 52 such as a piezoelectric transducer which responds to signals from a variable amplitude voltage source 54 for generating acoustic waves which are transmitted through the cell. Transducer 52 is elongated in the direction transverse to the light beam so as to produce a sheet beam of acoustic waves which serve to intensity modulate the first order diffracted beam 56 as a function of the amplitude of the acoustic waves. Zero order beams are not shown in the figures, but appropriate stops are well known in the art.

From modulator cell 50, beam 56 passes into a Bragg diffraction cell 58 that serves to diffract, and hence deflect, a portion of the incoming light beam at an angle which is a function of the frequency of acoustic waves that propagate from an electro/mechanical transducer 60 on a second surface through cell 58 along the z-direction. Transducer 60 responds to signals from a variable frequency voltage source 62.

A reciprocal lens arrangement 64 beyond cell 58 reshapes the light beam into its original, pencil-like form. Thus, another cylindrical lens 66 collects the diffracted light emerging from cell 58 and concentrates it in the x-z plane. Finally, another cylindrical lens 68, disposed at the exit pupil of the system and confocal with cylindrical lens 66, is oriented so as to recollimate the light beam.

From the foregoing, it can be seen that the access time $\tau_m$ that it takes for an acoustic wave to cross the light beam in modulator 50 is minimized by propagating the acoustic waves through the modulator in a direction normal to the plane of the sheet beam, while the access time $\tau_d$ for an acoustic wave to cross the light beam in deflector 58 is maximized, resulting in a large number of resolvable spots. Further, by the present invention, this desirable result is effected without the need for separate, sheet beam forming optics for the modulator and for the deflector.

Figure 5:
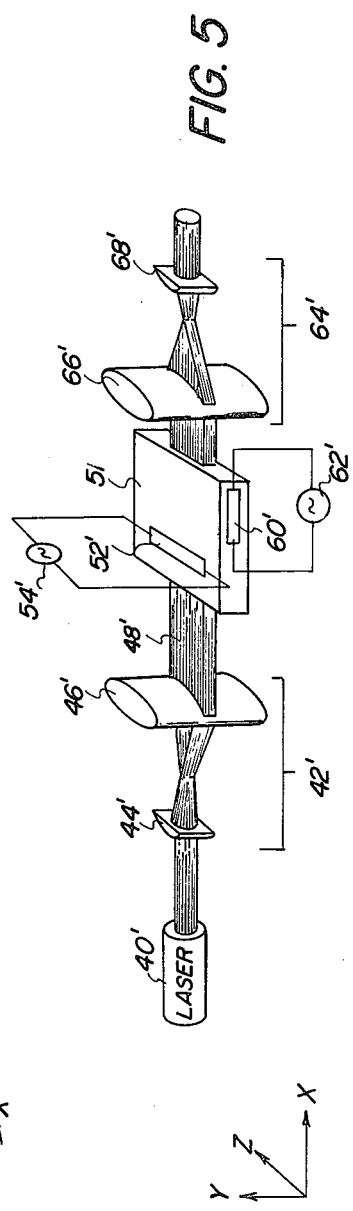
FIG. 5 is a schematic drawing of acoustooptic modulation and deflection apparatus in accordance with another preferred embodiment of the present invention.

In the embodiment illustrated in FIG. 4, the acoustooptic cell means for modulating and deflecting the light beam comprised separate cells for each function. In FIG. 5, I have shown an embodiment wherein a single acoustooptic cell is provided. Elements common to both embodiments (FIGS. 4 and 5) have been designated with the same reference numerals in both figures, prime marks being added in FIG. 5.

Sheet beam 48' is shown impinging upon and passing through an acoustooptic cell 51. Mounted upon orthogonal first and second surfaces of cell 51 are transducers 52' and 60', respectively, for amplitude modulating and angularly deflecting the beam as it passes through cell 51. Transducer 52' is attached to the cell in a plane normal to the minor axis of sheet beam 48', and transducer 60' is attached in a plane normal to the beam's major axis.

While sheet beam forming optics 42 and reciprocal lens arrangement 64 (42' and 64' in FIG. 5) have been shown as comprising a series of cylindrical lenses, it will be understood that various other optical systems may be equally suited for this purpose. For instance, U.S. Pat. No. 3,799,652, which issued on Mar. 26, 1974 to R. Torguet, discloses a series of prisms capable of producing a sheet beam of light.

The invention has been described in detail with particular reference to certain preferred embodiments thereof, but it will be understood that variations and modifications can be effected within the spirit and scope of the invention.

What is claimed is:

1. Apparatus for intensity-modulating and angularly-deflecting a beam of monochromatic radiation, said apparatus comprising:

(a) optical means for spreading the beam to form a sheet beam having, in a plane normal to the beam, predetermined orthogonal major and minor axes;
(b) first means for propagating an acoustic wave of varying amplitude through said sheet beam in a direction substantially parallel to said minor axis to intensity-modulate said sheet beam; and
(c) second means for propagating a variable frequency acoustic wave through said sheet beam in a direction substantially parallel to said major axis to angularly deflect said sheet beam, said first and second propagating means being spaced apart without any beam-shaping optical elements positioned therebetween.

2. Apparatus as defined in claim 1 wherein said first and second propagating means comprise:
(a) acoustooptic cell means positioned in said sheet beam, said cell means having a first surface normal to said minor axis and a second surface normal to said major axis;
(b) a first electromechanical transducer mounted on said first surface;
(c) a voltage source having an amplitude-modulatable output, said oscillator being operatively coupled to said first electromechanical transducer;
(d) a second electromechanical transducer mounted on said second surface; and
(e) a variable frequency voltage source operatively coupled to said second transducer.

3. Apparatus as defined in claim 1 wherein:
(a) said first propagating means comprises (1) a first acoustooptic medium positioned in the path of said sheet beam, (2) an electromechanical transducer operatively coupled to said medium and (3) voltage source having an amplitude-modulated output which is operatively connected to said transducer; and
(b) said second propagating means comprises (1) a second acoustooptic medium positioned in the path of said sheet beam, (2) an electromechanical transducer operatively coupled to said medium and (3) a variable frequency voltage source having an output operatively connected to said second transducer.

4. Apparatus as defined in claim 3 wherein said first and second acoustooptic media are integral.

5. Apparatus as defined in claim 3 wherein said second acoustooptic medium is arranged in the path of said sheet beam so as to be impinged by said sheet beam after said sheet beam leaves said first acoustooptic medium.

6. A method for intensity-modulating and angularly-deflecting a beam of monochromatic radiation, said method comprising the steps of:
(a) optically spreading said beam to form a sheet beam having, in a plane normal to the beam, predetermined orthogonal major and minor axes;
(b) propagating a fixed frequency acoustic wave of varying amplitude through one portion of said sheet beam in a direction substantially parallel to said minor axis to intensity-modulate said beam; and
(c) propagating prior to reshaping said sheet beam a variable frequency acoustic wave through another portion of the same sheet beam in a direction substantially parallel to said major axis to angularly deflect said sheet beam.

* * * * *